United States Patent
Qian et al.

(10) Patent No.: US 6,935,284 B2
(45) Date of Patent: Aug. 30, 2005

(54) POWER SYSTEM

(75) Inventors: Pu Qian, Saitama (JP); Kohjiroh Aimoto, Saitama (JP); Takahiro Gunji, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 6 days.

(21) Appl. No.: 10/453,894

(22) Filed: Jun. 4, 2003

(65) Prior Publication Data

US 2004/0045514 A1 Mar. 11, 2004

(30) Foreign Application Priority Data

Jun. 6, 2002 (JP) ........................................ 2002-165447

(51) Int. Cl.$^7$ ................................................ F02B 43/08
(52) U.S. Cl. ............................ 123/3; 123/253; 123/1 A
(58) Field of Search ......................... 123/3, 253, 1 A

(56) References Cited

U.S. PATENT DOCUMENTS

| 2,799,255 | A | * | 7/1957 | Gehres | 123/1 R |
|---|---|---|---|---|---|
| 3,718,710 | A | * | 2/1973 | Quisenberry | 585/300 |
| 3,855,980 | A | * | 12/1974 | Weisz et al. | 123/3 |
| 4,060,568 | A | * | 11/1977 | Rodewald | 585/640 |
| 4,070,993 | A | * | 1/1978 | Chen | 123/3 |
| 4,632,774 | A | * | 12/1986 | Fox et al. | 252/373 |
| 4,884,531 | A | * | 12/1989 | Degnan et al. | 123/3 |
| 4,936,976 | A | * | 6/1990 | Harandi et al. | 208/66 |
| 5,524,582 | A | * | 6/1996 | Suh et al. | 123/179.8 |
| 6,601,560 | B1 | * | 8/2003 | Serve | 123/260 |
| 6,739,289 | B2 | * | 5/2004 | Hiltner et al. | 123/3 |

FOREIGN PATENT DOCUMENTS

JP 61-31301 7/1986

* cited by examiner

Primary Examiner—Henry C. Yuen
Assistant Examiner—Jason Benton
(74) Attorney, Agent, or Firm—Arent Fox, PLLC

(57) ABSTRACT

A power system includes an internal combustion engine having a primary combustion chamber and a secondary combustion chamber, a first fuel being supplied to the primary combustion chamber, a second fuel being burned in the secondary combustion chamber so as to ignite the first fuel; a reformer that reforms a fuel by a dehydrocyclization reaction to generate an aromatic-rich high-octane-value liquid fuel together with a hydrogen-rich gaseous fuel; a gas/liquid separator that separates the liquid fuel from the gaseous fuel; and devices for respectively supplying the liquid fuel as the first fuel to the primary combustion chamber and the gaseous fuel as the second fuel to the secondary combustion chamber. Thus, the power system improves the combustion efficiency of the internal combustion engine.

5 Claims, 2 Drawing Sheets

POWER SYSTEM

BACKGROUND OF THE INVENTION

1. Field of the Invention

The present invention relates to a power system and, in particular, a power system that includes an internal combustion engine having primary and secondary combustion chambers.

2. Description of the Related Art

As such an internal combustion engine, an arrangement is known in which a lean primary gas mixture is supplied to a primary combustion chamber via a primary intake valve, a rich secondary gas mixture is supplied to a secondary combustion chamber via a secondary intake valve, and the flame generated by combustion of the secondary gas mixture induces ignition and combustion of the primary gas mixture (for example, Japanese Patent Publication No. 61-31301). In this internal combustion engine, excellent combustion efficiency can be obtained by burning the lean primary gas mixture. Furthermore, since the combustion occurs uniformly, it is possible to reduce pollutants such as nitrogen oxides and carbon monoxide.

However, since the conventional arrangement employs, as the secondary gas mixture, a hydrocarbon fuel which has a low combustion rate, it is difficult to further improve the combustion efficiency by fully increasing the leanness of the primary gas mixture.

SUMMARY OF THE INVENTION

The object of the present invention is to provide a power system in which the combustion efficiency of the internal combustion engine can be further improved.

In order to accomplish the above object, an aspect of the present invention provides a power system that includes an internal combustion engine having a primary combustion chamber and a secondary combustion chamber, a first fuel being supplied to the primary combustion chamber, a second fuel being burned in the secondary combustion chamber to generate a flame for igniting the first fuel; a reformer that reforms fuel by a dehydrocyclization reaction to generate an aromatic-rich high-octane-value liquid fuel together with a hydrogen-rich gaseous fuel; a gas/liquid separator that separates the liquid fuel from the gaseous fuel; and devices for respectively supplying the liquid fuel as the first fuel to the primary combustion chamber and the gaseous fuel as the second fuel to the secondary combustion chamber.

Hydrogen has a wide combustible gas mixture range and an extremely fast combustion rate. Using a hydrogen-rich gaseous fuel as the second fuel for igniting the first fuel enables the first fuel to be completely burned even when the leanness of the primary gas mixture, which is the first fuel, in the primary combustion chamber is fully increased. Moreover, since part of the fuel supplied to the primary combustion chamber can be reformed by the dehydrocyclization reaction into an aromatic-rich high-octane-value liquid fuel and a hydrogen-rich gaseous fuel, it is unnecessary to prepare hydrogen in advance as the second fuel.

The above-mentioned object, other objects, characteristics, and advantages of the present invention will become apparent from an explanation of a preferred embodiment that will be described in detail below by reference to the attached drawings.

DESCRIPTION OF THE PREFERRED EMBODIMENT

Figure 1:
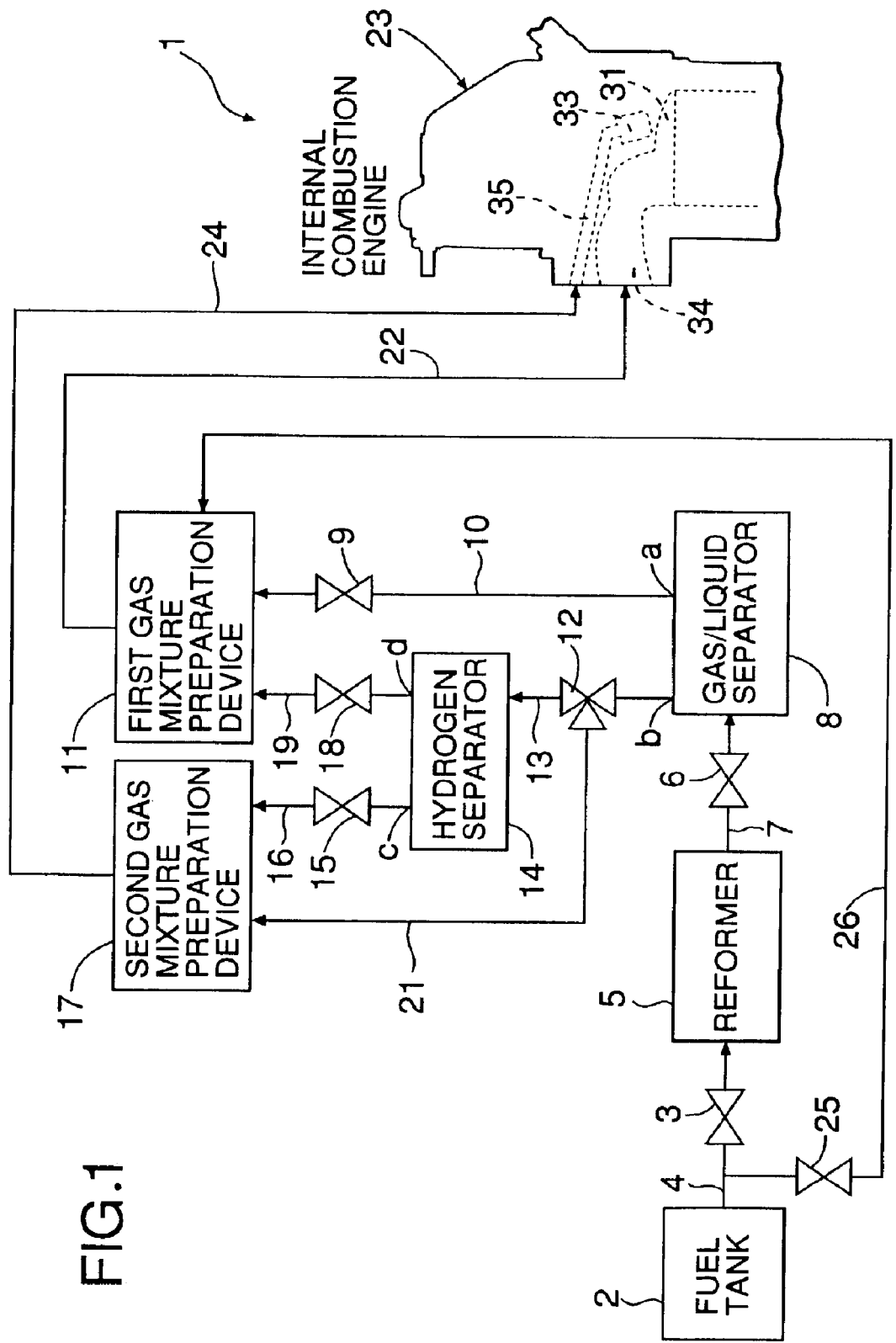
FIG. 1 is a schematic diagram of a power system.

In a power system 1 shown in FIG. 1, a fuel tank 2 is connected to the inlet side of a reformer 5 via a first supply pipe 4 having a first open/close valve 3, and the outlet side of the reformer 5 is connected to the inlet side of a gas/liquid separator 8 via a second supply pipe 7 having a second open/close valve 6. A liquid outlet a side of the gas/liquid separator 8 is connected to a first inlet side of a first gas mixture preparation device 11 via a third supply pipe 10 having a third open/close valve 9. A gas outlet b side of the gas/liquid separator 8 is connected to the inlet side of a hydrogen separator 14 via a fourth supply pipe 13, which is connected to first and second ports of a three-way valve 12. A hydrogen outlet c side of the hydrogen separator 14 is connected to a first inlet side of a second gas mixture preparation device 17 via a fifth supply pipe 16 having a fourth open/close valve 15. A hydrocarbon gas outlet d side of the hydrogen separator 14 is connected to a second inlet side of the first gas mixture preparation device 11 via a sixth supply pipe 19 having a fifth open/close valve 18. A third port of the three-way valve 12 is connected to a second inlet side of the second gas mixture preparation device 17 via a seventh supply pipe 21. The outlet side of the first gas mixture preparation device 11 is connected to a first fuel inlet side of an internal combustion engine 23 via an eighth supply pipe 22. The outlet side of the second gas mixture preparation device 17 is connected to a second fuel inlet side of the internal combustion engine 23 via a ninth supply pipe 24.

The fuel tank 2 contains fuel which is used as fuel for the internal combustion engine and is reformed by a dehydrocyclization reaction in the reformer 5. As such a fuel, a hydrocarbon, an alcohol, an ether, etc. can be used. The reformer 5 reforms the fuel supplied from the fuel tank 2 by a dehydrocyclization reaction to generate an aromatic-rich high-octane-value liquid fuel and a hydrogen-rich gaseous fuel.

The gas/liquid separator 8 has a function of separating the high-octane-value liquid fuel and the gaseous fuel from the product from the reformer 5. The whole or a part of the liquid fuel separated in the gas/liquid separator 8 is supplied to the first gas mixture preparation device 11 via the third supply pipe 10 having the third open/close valve 9. On the other hand, the whole or a part of the gaseous fuel separated in the gas/liquid separator 8 is separated into hydrogen and a hydrocarbon gas in the hydrogen separator 14. The whole or a part of the hydrogen separated in the hydrogen separator 14 is supplied to the second gas mixture preparation device 17 via the fifth supply pipe 16 having the fourth open/close valve 15. On the other hand, the whole or a part of the hydrocarbon gas separated in the hydrogen separator 14 is supplied to the first gas mixture preparation device 11 via the sixth supply pipe 19 having the fifth open/close valve 18. Switching over the three-way valve 12 allows the whole or a part of the gaseous fuel separated in the gas/liquid separator 8 to be fed to the second gas mixture preparation device 17 while bypassing the hydrogen separator 14. The fuel tank 2 is connected to a third inlet side of the first gas mixture preparation device 11 via a tenth supply pipe 26 having a sixth open/close valve 25.

Figure 2:
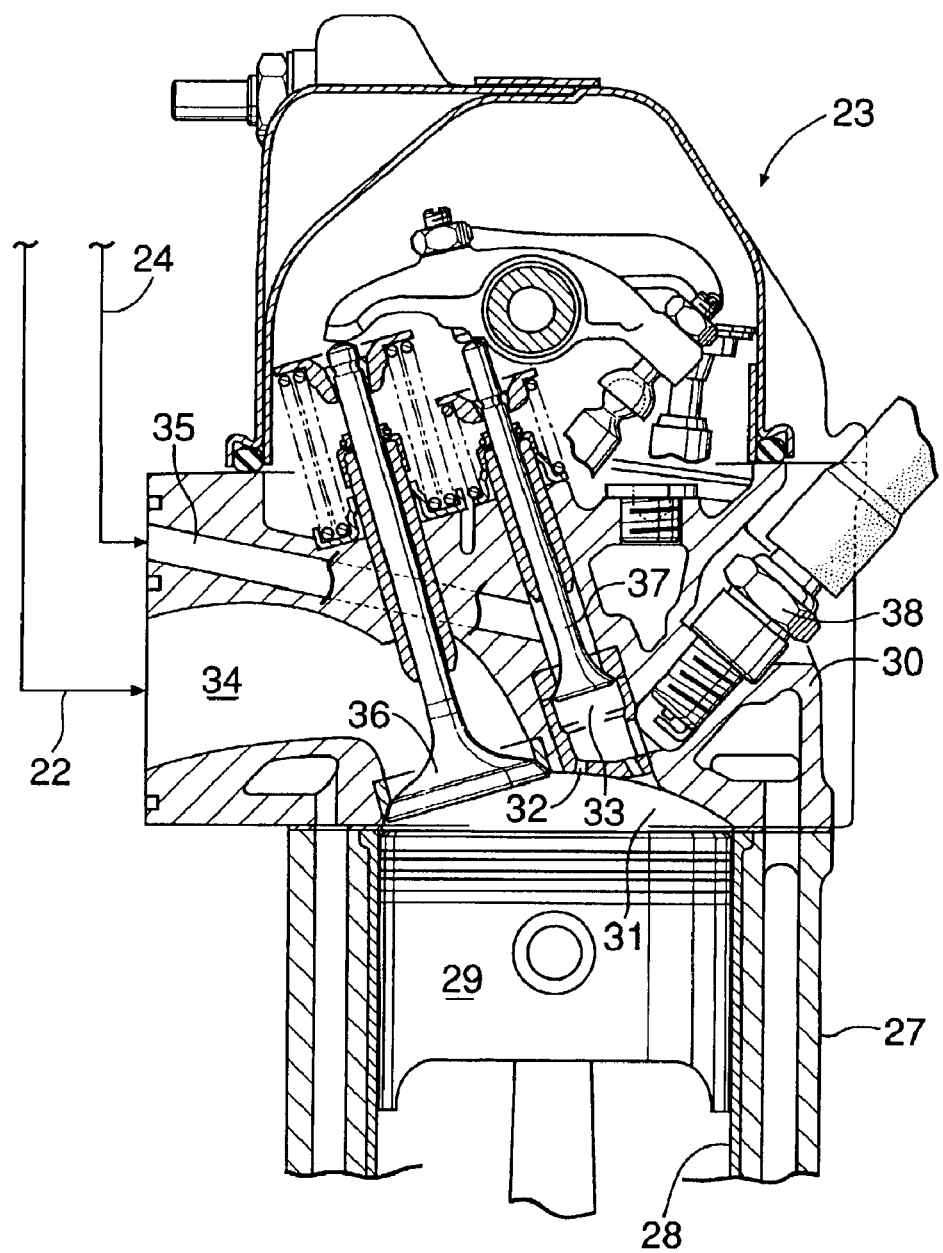
FIG. 2 is a cross sectional view of an internal combustion engine.

As shown in FIG. 2, a piston 29 is slidably fitted within a cylinder bore 28 of a cylinder block 27 of the internal combustion engine 23. Formed in a cylinder head 30 are a primary combustion chamber 31, a secondary combustion chamber 33, a primary intake port 34, an exhaust port (not illustrated), and a secondary intake port 35. The primary combustion chamber 31 is defined by the piston 29, the secondary combustion chamber 33 communicates with the primary combustion chamber 31 via a torch nozzle 32, the primary intake port 34 and the exhaust port open into the primary combustion chamber 31, and the secondary intake port 35 opens into the secondary combustion chamber 33. The primary intake port 34 is opened and closed by the primary intake valve 36, the secondary intake port 33 is opened and closed by the secondary intake valve 37, and the exhaust port is opened and closed by an exhaust valve (not illustrated). Electrodes of a spark plug 38 screwed into the cylinder head 30 face the secondary combustion chamber 33. The primary intake port 34 is the first fuel inlet side, to which the eighth supply pipe 22 is connected. The secondary intake port 35 is the second fuel inlet side, to which the ninth supply pipe 24 is connected.

The first gas mixture preparation device 11 functions as a device for preparing a primary gas mixture from air and at least one selected from the fuel within the fuel tank 2, the high-octane-value liquid fuel separated by the gas/liquid separator 8, and the hydrocarbon gas separated by the hydrogen separator 14, and feeds the primary gas mixture to the primary combustion chamber 31 via the eighth supply pipe 22 and the primary intake port 34 of the internal combustion engine 23.

The second gas mixture preparation device 17 functions as a device for preparing a secondary gas mixture from hydrogen and air or from air and the hydrogen-rich gaseous fuel, and feeds the secondary gas mixture to the secondary combustion chamber 33 via the ninth supply pipe 24 and the secondary intake port 35 of the internal combustion engine 23.

The reformer 5 is packed with a catalyst that is active in accelerating a dehydrocyclization reaction. This type of catalyst is desirably a crystalline aluminosilicate such as, for example, a zeolite and, in particular, a ZSM-5 zeolite having an MFI structure, which preferably contains at least one selected from gallium, zinc, and platinum. The temperature of the dehydrocyclization reaction is set at 400° C. to 700° C.

Table 1 shows the results of reforming in which a dehydrocyclization reaction was carried out using n-pentane as the fuel and, as the catalyst, each of a protonated ZSM-5 (H-ZSM-5), a Ga-modified ZSM-5 (Ga-ZSM-5), and a Zn-modified ZSM-5 (Zn-ZSM-5). The gallium and zinc contents were 2 wt % of the weight of the catalyst. The reforming conditions were a weight hourly space velocity (WHSV) of 2 h$^{-1}$, a reforming temperature of 550° C., and a reforming pressure of 0.1 MPa.

TABLE 1

| Catalyst | Reformed fuel components (wt %) | | |
|---|---|---|---|
| | Hydrogen | Paraffinic hydrocarbon gas | Aromatic hydrocarbon |
| H-ZSM-5 | 2.0 | 54.9 | 43.1 |
| Ga-ZSM-5 | 3.0 | 46.4 | 50.6 |
| Zn-ZSM-5 | 3.6 | 44.8 | 51.6 |

It is clear from Table 1 that the use of H-ZSM-5 as the catalyst can sufficiently promote the dehydrocyclization reaction. It was also found that, when a catalyst obtained by modifying H-ZSM-5 with gallium or zinc was used, the yields of the aromatic hydrocarbon and hydrogen increased as compared with the case where H-ZSM-5 was used.

In the above-mentioned arrangement, fuel within the fuel tank 2 is supplied to the reformer 5 via the first supply pipe 4 with the first open/close valve 3 open. In the reformer 5, the fuel is reformed by the dehydrocyclization reaction, thereby generating the aromatic-rich high-octane-value liquid fuel and the hydrogen-rich gaseous fuel.

The product from the reformer 5 is fed into the gas/liquid separator 8 through the second supply pipe 7 with the second open/close valve 6 open. In the gas/liquid separator 8, the high-octane-value liquid fuel and the gaseous fuel are separated from each other, and the high-octane-value liquid fuel is fed to the first gas mixture preparation device 11 through the third supply pipe 10 with the third open/close valve 9 open. The gaseous fuel separated in the gas/liquid separator 8 is fed into the hydrogen separator 14 through the fourth supply pipe 13 with the first and second ports of the three-way valve 12 connected through.

In the hydrogen separator 14, the gaseous fuel is separated into hydrogen and the hydrocarbon gas, and the hydrocarbon gas is fed into the first gas mixture preparation device 11 through the sixth supply pipe 19 with the fifth open/close valve 18 open. On the other hand, the hydrogen separated in the hydrogen separator 14 is fed into the second gas mixture preparation device 17 through the fifth supply pipe 16 with the fourth open/close valve 15 open.

In the first gas mixture preparation device 11, the primary gas mixture is prepared from, for example, the fuel supplied from the fuel tank 1, the aromatic-rich high-octane-value liquid fuel, the hydrocarbon gas, and air, and the primary gas mixture is fed into the primary intake port 34 of the internal combustion engine 23 through the eighth supply pipe 22. In this case, the fuel supplied from the fuel tank 1, the aromatic-rich high-octane-value liquid fuel, and the hydrocarbon gas can be used at any ratio. On the other hand, in the second gas mixture preparation device 17, the secondary gas mixture is prepared from air and hydrogen or the hydrogen-rich gaseous fuel, and the secondary gas mixture is fed to the secondary intake port 35 of the internal combustion engine 23 through the ninth supply pipe 24.

In the internal combustion engine 23, when the primary and secondary intake valves 36 and 37 open during the intake stroke of the piston 29, the primary gas mixture is supplied from the primary intake port 34 into the primary combustion chamber 31, and the secondary gas mixture is supplied from the secondary intake port 35 into the secondary combustion chamber 33. During the following compression stroke, the secondary gas mixture within the secondary combustion chamber 33 is ignited by a spark discharge of the spark plug 38, and the resulting flame shoots into the primary combustion chamber 31 through the torch nozzle 32, thereby igniting the primary gas mixture within the primary combustion chamber 31 and making it burn. This enables a lean gas mixture with a high overall air-fuel ratio to be burned. The piston 29 then moves to the expansion stroke, and when the exhaust valve is opened during the following exhaust stroke, the exhaust gas is discharged via the exhaust port and an exhaust pipe. In this way, the internal combustion engine 23 operates.

Table 2 shows the result of reforming in which a dehydrocyclization reaction was carried out using, as a fuel, isooctane (2,2,4-trimethylpentane), which is a major component of high-octane gasoline and, as a catalyst, a Ga-modified ZSM-5 (Ga-ZSM-5). The gallium content was 1.5 wt % of the weight of the catalyst. The reforming conditions were a weight hourly space velocity (WHSV) of $2\ h^{-1}$, a reforming temperature of 530° C., and a reforming pressure of 0.1 MPa.

TABLE 2

| | Reformed fuel components (wt %) | | | |
|---|---|---|---|---|
| Catalyst | Hydrogen | Paraffinic hydrocarbon gas | Aromatic hydrocarbon | Unreacted component |
| Ga-ZSM-5 | 1.5 | 24.7 | 30.2 | 43.6 |

Although an unreacted component is generated when isooctane is used as the fuel, such a fuel is also usable in the present invention.

In accordance with the present invention, the above-mentioned arrangement allows the first fuel to be completely burned even when its leanness is fully increased, thus further improving the combustion efficiency and reducing the pollutants in the exhaust gas. Since it is possible to generate hydrogen by reforming the fuel of the fuel tank, it is unnecessary to prepare hydrogen in advance, thus simplifying the arrangement of the power system.

Although an embodiment of the present invention is explained in detail above, the present invention can be modified in a variety of ways without departing from the spirit and scope of the present invention.

What is claimed is:

1. A power system comprising:

an internal combustion engine having a primary combustion chamber and a secondary combustion chamber, a first fuel being supplied to the primary combustion chamber, a second fuel being burned in the secondary combustion chamber so as to ignite the first fuel;

a reformer that reforms a fuel by a dehydrocyclization reaction to generate an aromatic-rich high-octane-value liquid fuel together with a hydrogen-rich gaseous fuel;

a gas/liquid separator that separates the liquid fuel from the gaseous fuel; and devices for respectively supplying the liquid fuel as the first fuel to the primary combustion chamber and the gaseous fuel as the second fuel to the secondary combustion chamber.

2. The power system according to claim 1 wherein it further comprises a hydrogen separator that separates hydrogen from the gaseous fuel separated in the gas/liquid separator, the separated hydrogen being supplied to the secondary combustion chamber as the second fuel.

3. The power system according to either claim 1 or 2, wherein the dehydrocyclization reaction employs a crystalline aluminosilicate as a catalyst.

4. The power system according to claim 3 wherein the crystalline aluminosilicate has an MFI structure.

5. The power system according to claim 4 wherein the crystalline aluminosilicate contains at least one selected from gallium, zinc, and platinum.

* * * * *